UNITED STATES PATENT OFFICE 2,525,178

REMOVING SILVER FILMS FROM MIRRORS WITH PHOSPHORIC ACID

Earvy R. Miller, Santa Monica, Calif., assignor to Turco Products, Inc., Los Angeles, Calif., a corporation of California No Drawing. Application January 18, 1947, Serial No. 722,962

4 Claims. (Cl. 134—30)

This invention relates to processes for the removal of silver from mirrors and to compositions of matter useful in such processes. In order that my invention may be better understood, it may be useful to consider the methods now employed commercially in forming mirrors and in removing silver films from mirrors.

Processes now employed commercially in the manufacture of mirrors do not differ substantially from that originally introduced by Baron Liebig about one hundred years ago. Liebig discovered that an ammoniacal silver nitrate solution will deposit silver in the presence of a reducing agent upon a heated glass surface. The mixed ingredients are poured out on a glass to be silvered and the silver is deposited from the mixture. It is then washed and cleaned. Except for relatively minor changes in the composition of the reducing solutions, the present silvering solutions are essentially the same as used by Liebig. Two main classifications of such processes are now employed: one in which the temperature is held at about atmospheric, and the other, the hot process, wherein the temperature is elevated. The solutions employed are somewhat different.

It is also usual to coat the silvered surface with shellac and paint or other organic coating compositions. Such coatings are frequently filled with metallic powder such as aluminum, bronze, or copper powder and sometimes filled with fillers such as calcium carbonate.

The usual practice heretofore employed in removing such silver from the glass in order to reclaim the glass and the silver involves a removal of the organic coating by caustic alkali and the subsequent corrosion, i. e., solution, of the silver by means of corrosive acids such as sulphuric, nitric or hydrochloric mixed with nitric acid. The conventional commercial method heretofore employed is illustrated by the following procedure:

The silver backing of the mirror is scrubbed with caustic soda and allowed to stand from 45 minutes to an hour in contact with caustic soda. This usually loosens the paint and shellac which are rinsed off with a garden hose. Hydrochloric acid is then applied and the silver is scrubbed with a brush. This usually takes from about 15 to 20 minutes. The excess acid is washed off. Instead of muriatic acid, sulphuric acid or nitric acid may be employed. All such acids act to corrode or eat away the silver by solution thereof or conversion into a salt. Not only is this process slow and costly and results in the formation of impure dilute solutions and suspension of silver salts which are difficult to reclaim, but also the corrosive nature of the acids requires the use of wooden tanks since steel tanks corrode. Wooden tanks deteriorate rapidly in this service. The process is also a health hazard since the mirrors must be scrubbed with caustic alkali and then treated with strong acid.

I have found that I can remove the silver from a silvered mirror without material corrosion or solution of the silver. The silver is removed as metallic silver in relatively large strips or sheets. I may thus speed up to a great extent the process of the removal of such silver and recover the silver as silver, i. e., without destroying the metallic nature thereof. Instead of corroding the silver I destroy the bond between the metallic silver film and the glass and thus permit the metallic film to be removed from the glass surface without material destruction of the nature of the silver forming the film.

I have found that a solution of phosphoric acid, either meta, pyro, and particularly orthophosphoric acid, when applied to the back of a mirror, acts to separate the silver film from the glass surface. The silver film is removed in relatively large sheets or strips or pieces from the glass surface without any substantial corrosion or destruction of the silver and the silver film comes off as silver.

While I cannot explain why the phosphoric acid applied to the back of a metallic film of silver which is substantially inert to the attack of the phosphoric acid, that is, is not corroded or dissolved by the phosphoric acid, will cause a separation of the film of silver from the glass, the fact is that the silver film appears to separate from the glass as if the bond between the glass and the silver film were broken by the application of the phosphoric acid solution to the back of the silver film.

I also find that the activity of the phosphoric acid solution in removing the silver film from the mirror is materially aided by the addition of a wetting agent and particularly by an anion active, surface active agent, as, for example, the sodium salt of an alkylated aryl poly ether sulphonate. This agent is given by way of illustration, and any of the well known wetting agents, as, for example, any well known anion active wetting agent or a non-ionic surface active agent which will not react with phosphoric acid, i. e., is active in acid solutions, may be employed. Such agents are well known and are commercially available and well understood by those skilled in the art who will be able to select a suitable wetting agent to meet the requirement that it be active in acid solutions from the commercial catalogues of the distributors of such agents. Reference may be had to the Journal of Industrial Engineering Chemistry, vol. 35, pp. 126–130, Jan., 1943, for a list of such suitable wetting agents. Of those listed therein the sulphonated or sulphated compounds are especially useful. The amines or other basic compounds or those cationic agents which are inactivated by the phosphoric acid solution are not as useful. This list is herein incorporated by reference as those agents which may be employed.

Where the mirror is coated with shellac or paint or other organic coating material, it is also useful to incorporate into the phosphoric acid solution some solvent or softening agent for the film. While, especially if no organic coating is employed, the solvent is omitted where the organic coating is employed, the process is speeded by the use of such solvent. It has been found by experience that the softening agent or solvent for the paint may be either miscible or non-miscible with water solution of the phosphoric acid, since it is found that both miscible and non-miscible solvents are useful for the treatment of the mirror backing. It is not necessary that the paint remover solvent act to completely dissolve the paint or shellac backing, since it has been found by experience that a mere softening or destruction of the integrity of the paint or shellac backing is sufficient to permit the removal of the silver film.

It is therefore possible to use any of the conventional paint removing solvents and the shellac removing solvents which have been employed heretofore in the paint and shellac removing art and the identification or selection of the particular organic solvents to be employed in my composition will depend upon the specific nature of the organic coating employed with the mirror. Thus, where the coating is of a synthetic resin type or synthetic resin lacquer, one may select any of the solvents listed by Simonds and Ellis in their Handbook of Plastics, published by Van Nostrand Co., 7th printing, pages 240 to 249, and select the particular solvent by reference to the solubility therein of the particular resin type employed in organic coatings, and said list is hereby incorporated by reference. It is to be noted, however, that since the solvent is to be employed in an acid solution of phosphoric acid, solvents which react with the phosphoric acid, such as amines, especially water soluble amines, should be avoided.

Where the coating is of the shellac type or oil paint type, a suitable alcohol, or glycol or glycol ether or ether may be employed. For example, I may employ monohydric and polyhydric alcohol, such as methyl, ethyl, propyl, or isopropyl alcohol and employ also the polyhydric alcohols, such as glycol or glycerine and the ethers of such glycols, for example, ethylene glycol, propylene glycol, diethylene glycol, hexane 1,2 diol, diethylene glycol, polyethylene glycol, glycerine, the glycol ethers, such as ethylene glycol monoethyl ether, butyl ether, ethylene glycol monopropyl ether. I may employ the ketones, such as acetone, methyl ethyl ketone, diethyl ketone, acetonyl acetone, isophorone, diacetone alcohol. I may employ the chlorinated compounds, such as methylene chloride, ethylene chloride, trichlorethylene, dichlorethylene, monochlor benzene and dichlor benzene. All of these are listed merely to illustrate the nature of the solvents employed and are not intended to limit the scope of the invention to such listed compounds. All of such compounds have solvent action for the protective films as described above.

It has been found desirable to choose from the above solvents, when the process is to be carried out at an elevated temperature, those solvents whose flash point is sufficiently high to be safe at the elevated temperature employed. Thus, when the solvent is miscible with water the flash point (determined by the Cleveland open cup method) should be 150° F., and if not miscible with water, 200° F., when using these materials in the process at temperatures specified below as suitable, i. e., 160° to 190° F.

Solvents which have been found especially useful in connection with this invention for temperatures of treatment in the above region are as follows: hexanol, heptanol, ethylene glycol, diethylene glycol, hexylene glycol, diethyl ether of ethylene glycol, the monomethyl or monophenyl or monobutyl ether of ethylene glycol, diethylene glycol monoethyl ether, acetone, diacetone alcohol, methyl ethyl ketone, gamma valero lactone.

The solution of the acid, with or without the wetting agent and paint remover solvent, acts with much greater rapidity than the above processes of the prior art, and is substantially non-corrosive either to the silver of the mirror or to stainless steel, and therefore the process may be carried out in stainless steel tanks at high temperatures. Since the removal of the film is by means of a physico-chemical process rather than by a corrosive action and mechanical attrition, as in the prior art, the process is also much less of a health hazard.

A suitable formula for a composition useful in desilvering mirrors according to this invention follows: 78 parts by weight of a 75% solution of orthophosphoric acid in distilled water; 20 parts by weight of monobutyl ether of ethylene glycol; 2 parts by weight of an alkylated aryl poly ether sulphonate in the form of a viscous creamy liquid containing 28% by weight of solids. It is an anion active electrolyte and is a wetting agent. It has both wetting and emulsifying characteristics.

Because of the non-corrosive character of the solution in contradistinction to the corrosive acids heretofore used in removal of silver, the stripping may be conducted in stainless steel tanks, thus avoiding the difficulties arising from the use of wooden tanks.

The above mixture is mixed in various proportions with water. Thus, for example, the above composition is mixed with equal parts of distilled water and introduced into the tank and heated to a temperature of about 160 to 190° F. and maintained at this temperature during the treatment. The temperature is preferably not allowed to drop below 150° F. nor to be raised above about 200° F., i. e., it should be below the boiling point of the solution. At the lower temperature the reaction is too slow and at the elevated temperature the evaporation loss and flash danger are too great. The process is operative at lower temperatures, and even at ordinary room, i. e., atmospheric, temperature, for example, to 100° F., but it takes much longer to obtain the stripping obtained at the higher temperatures specified above. The mirrors are introduced into the tank and allowed to remain therein for various periods of time depending upon the concentration of the solution and upon the nature of the backing. Thus, where the mirror is not coated with an organic coating material or where the organic coating material is of a simple nature, such as a shellac or lacquer, the mirror is stripped within two to eighteen minutes. Where the mirror is backed with a paint backing, particularly an oil paint backing, the duration of immersion at temperatures above 150° F. may be increased to from 30 to 45 minutes. The mirrors are then withdrawn from the tank and introduced into a rinsing tank where they may be rinsed with hot or cold water. A stream of water under pressure is useful in removing any adhering silver.

In the desilvering tank the organic coating softens and the silver surface strips off in relatively large sheets and falls to the bottom with the organic coating as a sludge. It is desirable that the mirror be maintained off the bottom of the tank so that it does not rest in the sludge and the temperature be kept at a relatively high temperature of about 170° F. since the reaction rate is materially increased by elevated rather than by lower temperatures.

While the stripping rate of the phosphoric acid solution without the wetting agent will result in an improved operation over the use of the corrosive acids, such as HCl, $HNO_3$, $H_2SO_4$, I find that the addition of about 1 to 2% or more of the wetting agent based upon the weight of the phosphoric acid employed increases the stripping rate by a factor of two, three or more times. The wetting agent speeds up the stripping process materially. The amount of wetting agent employed may be varied, depending on the particular wetting agent employed and the composition of the stripping agent. It should be added in amount sufficient to cause the agent to easily wet the glass and the mirror and backing. A wetting agent alone seems to have little or no effect upon the stripping of the sliver and apparently it takes the combined action of both the wetting agent and the phosphoric acid to give the high rate of stripping which I have observed from the use of my stripping agent. Thus, for example, a 2% solution of the Triton X 200 previously referred to, the solution having a pH of about 6, requires more than 36 hours to strip silver from a mirror. The same solution to which 75% by weight of phosphoric acid is added will strip the same silver backing from the same mirror in about 2 to 4 minutes. For the purpose of the above comparison, a silvered mirror without a shellac or paint backing was employed.

I have also found that the concentration of the phosphoric acid which is employed will affect the stripping time of the silver backing from various types of mirrors, depending upon the type of organic coating material employed. This concentration is illustrated by the following examples:

Four mirrors, Type A, A', B, and B', were subjected to the above process, employing with each type each of the four following solutions having the following weight proportions:

Formula 1

78% of 75% orthophosphoric acid;
2% of Triton X 200;
20% of monobutyl ether of ethylene glycol.

Formula 2

28% of 75% orthophosphoric acid;
2% of Triton X 200;
20% monobutyl ether of ethylene glycol;
50% distilled water.

Formula 3

3% of 75% orthophosphoric acid;
2% of Triton X 200;
20% of monobutyl ether of ethylene glycol;
75% of distilled water.

Formula 3 was a two-layer mixture and was well mixed before applying it to the mirror.

Formula 4

28% of 75% orthophosphoric acid;
2% of Triton X 200;
70% of distilled water.

Each of the mirrors, Type A, A', B, and B', was treated with the above solution. Type A and A' were coated by the same silvering process at one commercial establishment, but differed between themselves in the organic coating applied to the mirror. Type B and B' were silvered in a different commercial establishment by the same process, but differed between themselves in the nature of the organic coating which was also different from that of Type A and A'. They were all treated with the above solutions at a temperature of 175° F. The time necessary to completely strip the silver from the mirror was noted and is given in the following table:

| Formula | Time in Minutes at 175° F. to Remove Silver | | | |
| --- | --- | --- | --- | --- |
|  | 1 | 2 | 3 | 4 |
| Type A | 8 | 40 | 30 | 9 |
| Type A' | 64 | 11 | 32 | 82 |
| Type B | 5 | 2.5 | 4.5 | 7 |
| Type B' | 52 | 4 | 4.5 | 5 |

It will be seen that the concentration of the acid and the use and the concentration of organic coating softener employed determine the speed of removal and that for some coatings a high concentration of acid is best and for others a low concentration of acid is best. It is desirable before adjusting the composition to make bench tests as described above to determine the best composition for the mirror. It will be observed that Formula 2 has a general utility.

A useful composition will contain from 1 to 80% by weight of phosphoric acid, for example, orthophosphoric acid; from .5 to 5% by weight of wetting agent; and from 0 to 50% by weight of softening agent; and water to make up 100%. These proportions are not critical and may be adjusted by making the test experiments as described above.

While I have described a particular embodiment of my invention for the purpose of illustration, it should be understood that various modifications and adaptations thereof may be made within the spirit of the invention as set forth in the appended claims.

I claim:

1. A process of removing silver films from mirrors which comprises immersing said mirrors in a solution of ortho-phosphoric acid in water, said solution also containing a surface active agent, at a temperature below the boiling point of the mirror stripping agent, and removing the stripped mirror.

2. A process of removing silver films from mirrors which comprises immersing said mirrors in a solution of ortho-phosphoric acid in water, said solution also containing a surface active agent and a softening agent for organic coatings, at a temperature below the boiling point of the mirror stripping agent, and removing the stripped mirror.

3. A process of removing silver films from mirrors which comprises immersing said mirrors in a solution, containing from 2 to 60 parts by weight of ortho-phosphoric acid, from 2 to 75 parts by weight of water, about 1 to 2 parts by weight of an anion active wetting agent, and from 0 to 20 parts by weight of an organic coating softening agent, at a temperature below the boiling point of the mirror stripping agent, and removing the stripped mirror.

4. A process of removing silver films from mirrors which comprises immersing said mirrors in a solution containing 78 parts by weight of a 75% solution of ortho-phosphoric acid, 2 parts by weight of a sodium salt of an alkylated aryl polyether sulphonate, 20 parts by weight of monobutyl ether of ethylene glycol, with equal weight of water at a temperature below the boiling point of the mirror stripping agent, and removing the stripped mirror.

EARVY R. MILLER.

REFERENCES CITED

The following references are of record in the file of this patent:

UNITED STATES PATENTS

| Number | Name | Date |
| --- | --- | --- |
| 242,338 | Laval | May 31, 1881 |
| 2,166,476 | Neilson | July 18, 1939 |
| 2,413,495 | Given | Dec. 31, 1946 |